UNITED STATES PATENT OFFICE.

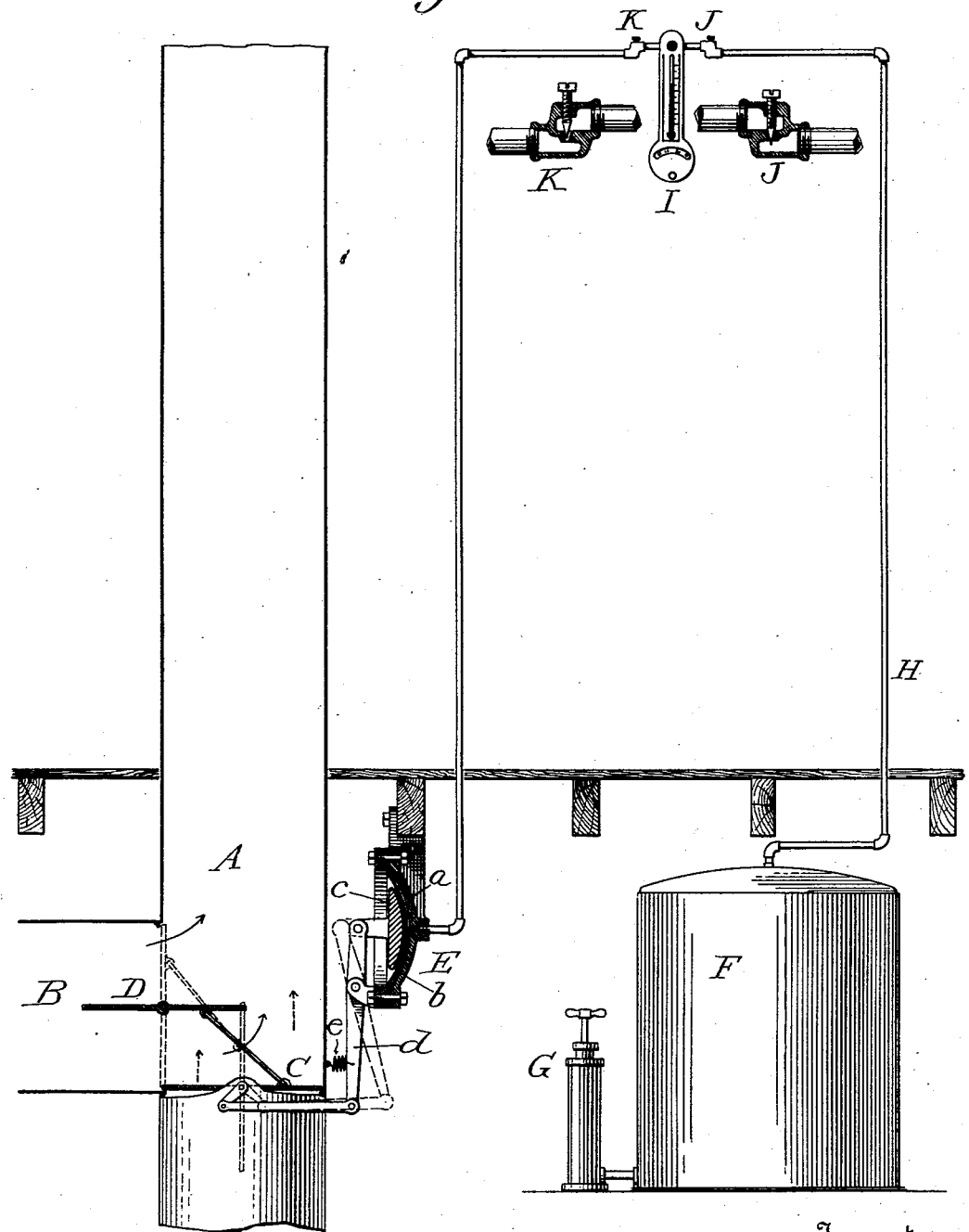

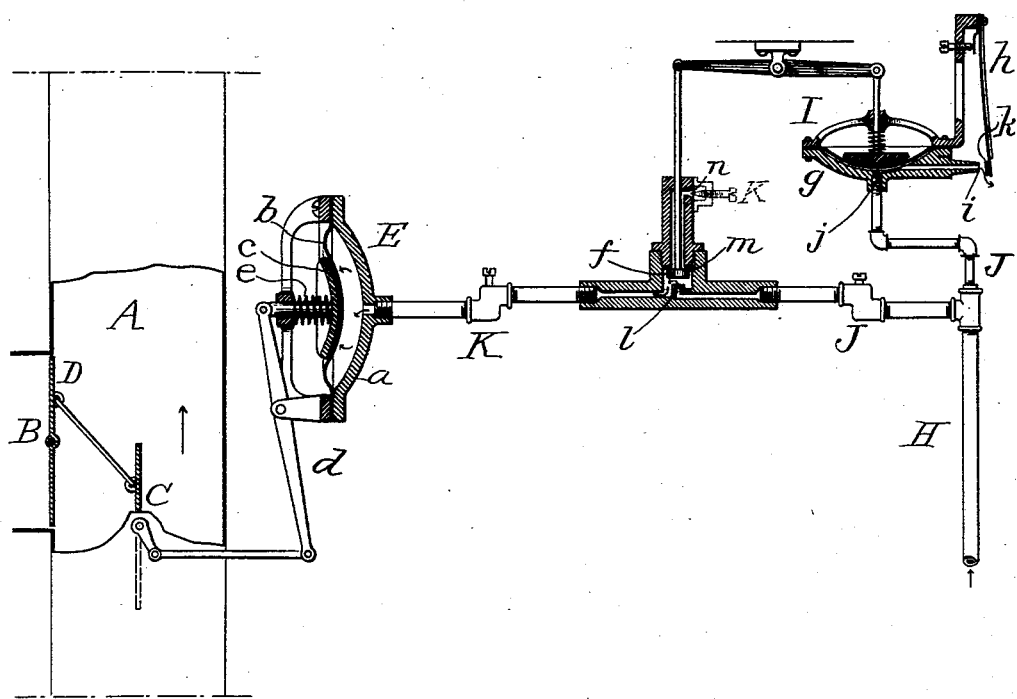

WARREN S. JOHNSON, OF MILWAUKEE, WISCONSIN.

TEMPERATURE REGULATING OR CONTROLLING DEVICE.

SPECIFICATION forming part of Letters Patent No. 568,950, dated October 6, 1896.

Application filed April 1, 1896. Serial No. 585,790. (No model.)

*To all whom it may concern:*

Be it known that I, WARREN S. JOHNSON, a citizen of the United States, residing at Milwaukee, in the county of Milwaukee and State of Wisconsin, have invented certain new and useful Improvements in Temperature Regulating or Controlling Devices, of which the following is a specification.

My invention relates to that class of temperature regulating or controlling devices in which a valve or damper is adjusted through the action of fluid-pressure mechanism controlled by a thermostatic device which opens and closes communication with the atmosphere and thereby vents or seals the fluid-pressure chamber, so as to relieve or to insure pressure therein according to changes in the temperature.

The purpose of the invention is to secure a gradual movement of the valve, damper, or other heat-controlling device, so as to prevent sudden or marked changes in the temperature of the apartment, such as are occasioned by the sudden opening or closing of valves or dampers, and this is attained by the employment of two reducing or regulating valves, one on either side the venting device, as hereinafter explained.

The invention is illustrated in connection with a thermostatic apparatus such as is set forth in Letters Patent of the United States granted to me the 16th day of July, 1895, numbered 542,733, with which it is preferred to combine this invention. I do not, however, restrict myself to its use in combination therewith, since any equivalent apparatus whereby a fluid-pressure chamber may be sealed or vented according to changes in the temperature of the apartment above and below a certain predetermined point, and the pressure thus be made available to control a draft, damper, or like device, may be used.

Figure 1 is a diagrammatic elevation of apparatus suitable for carrying out my invention, and Fig. 2 a sectional elevation on a larger scale.

In the figures, A indicates a pipe for the delivery of air to the apartment or chamber to be warmed and ventilated, said pipe having a lateral branch B, as shown. Under the arrangement here illustrated cold air is supposed to enter at the lower end of pipe A and warm air to enter through branch B, two connected valves or dampers C and D being shown for simultaneously opening one and closing the other of the inlets. For the purpose of actuating these valves or dampers there is provided a fluid-pressure motor E, which is preferably of the character illustrated. This consists of a concave shell or chamber $a$, a flexible diaphragm $b$, a convex head or disk $c$, resting against the diaphragm, and a lever $d$, connected with said disk and with a crank-arm of one of the damper-shafts, a spring $e$ serving to press the disk against the diaphragm and to offer a greater or less resistance to the pressure of the fluid within the chamber of the motor.

Obviously, any equivalent and well-known damper mechanism adapted to be actuated by fluid pressure may be employed, that shown being selected merely for convenience and clearness of illustration.

Motor E receives fluid, preferably air, under pressure from a tank or reservoir F, or directly from a pump G or any convenient source of supply, through a pipe H.

I indicates a thermostatic apparatus for automatically controlling the delivery of fluid under pressure to the motor E, Fig. 1 showing in elevation the particular form of apparatus set forth in my prior patent above mentioned. In Fig. 2 so much of said apparatus as is material to the present invention is illustrated in conventionalized form, but reference may be had to the patent for details not found herein should it be preferred to adopt its special construction. The parts necessary to the present invention are a valve, as $f$, introduced into the pipe H at a point between the motor E and its source of supply, a motor, as $g$, for actuating said valve, and a thermostat, as $h$, for controlling the motor $g$. The valve $f$ is so constructed and arranged as to open communication between the source of supply and motor E, at the same time closing communication between said motor and the atmosphere, or to close communication between said source and motor E and open communication between the motor and the atmosphere. This is conveniently accomplished by constructing the valve shell or casing with two seats, as in Fig. 2, one having an opening in communication with pipe II and the other having an opening in communication with the atmosphere, and arranging valve *f* to play between them and to close one as it opens the other.

The motor *g* is here represented as a fluid-pressure motor having an outlet or vent *i* of larger area than its inlet *j*, which latter is shown in communication with pipe H, so that the fluid-pressure chamber of the motor is always supplied with fluid under pressure. When the thermostat *h*, which carries a valve *k*, moves toward the vent *h* and seals it, the fluid under pressure within the chamber of motor *g*, having no escape, presses out the diaphragm and, acting through suitable connecting devices, seats the valve *f* upon the seal *l*, thereby shutting off communication between the source of supply and motor E. In doing this valve *f* leaves seat *m*, and thus opens communication between the fluid-pressure chamber of motor E and vent *n*, permitting the fluid to escape from said pressure-chamber under the pressure or force of spring *e*, thereby causing damper C to close and cut off the cold-air supply and damper D to open and permit the entrance of warm air.

When the thermostatic valve again opens vent *i*, the fluid under pressure therein escaping faster than a fresh supply can enter, the diaphragm collapses and valve *f* is moved from seat *l* to seat *m*, closing communication between motor E and the atmosphere and opening communication between supply-pipe H and motor E. This change results in the delivery of fluid under pressure to motor E, the distention of its diaphragm, and the consequent shifting of lever *d*, resulting in the closing of warm-air valve D and the opening of cold-air valve C. In all material respects this is the same as in my prior patent, though not in detail.

It will be seen that the time required to fill the pressure-chamber of motor E will depend upon the size of the supply-pipe or its smallest passage and the pressure of the fluid, and that the time required to discharge the fluid therefrom will depend upon the size of the vent or outlet or the smallest passage between it and motor E and upon the force of spring *e*. Since, however, the force of said spring must always be less than that of the fluid-pressure, it is evident that if the same size of orifice or passage control both the charging and discharging of motor E it will take longer to empty than to fill, and hence the valves or dampers will act more promptly in one than in the other direction. To remedy this fault, I employ two reducing-valves J and K, placing them on opposite sides of valve *f*, in the manner indicated in Figs. 1 and 2. These valves are best made of pin form, as shown, since the openings should in any event be very small, and nice regulation is quite important. Valve J is placed between the source of supply and the valve *f*, and is set to give a smaller passage-way than valve K, which is between valve *f* and motor E. This is because the full pressure of the fluid is available and operative to force the fluid through the opening of valve J, and having passed that it will freely pass through the larger opening of valve K, being practically unretarded therein. On the other hand, the fluid within motor E has comparatively little pressure (and that a rapidly-decreasing one) to force it out of the motor, even though assisted by spring *e*. Valve K is therefore set to give a freer passage than is afforded by valve J, and the relation of the two is nicely adjusted to give the motor and the dampers controlled by it the same speed or rate of movement in both directions, or such relative rates as may be found expedient in any given case.

I am of course aware that pressure-reducing valves are common and well known, but I know of no prior instance of their employment in the relation herein set forth, or of the attainment of the end here in view with apparatus of the character set forth.

Valve K may of course be applied to the vent *n*, if preferred, as indicated by dotted lines in Fig. 2. The thermostatic valve may be arranged to close on a rise or a fall of temperature above or below a predetermined limit, the damper or main temperature-controlling valve being set accordingly. Any system of heating may be adopted, a warm-air system being taken merely as an illustration.

Having thus described my invention, I claim—

1. In combination with a temperature-controlling valve or damper; a fluid-pressure motor for actuating the same, a source of fluid-pressure; an intermediate fluid-controlling valve adapted and arranged to open communication between the source of pressure and the fluid-pressure motor and to close communication between said motor and the atmosphere, and to close communication between the source of the supply and the motor, and open communication between the motor and the atmosphere; a motor for actuating said valve; a thermostat controlling said motor; a reducing-valve between the source of supply and the fluid-controlling valve; and a second reducing-valve between the fluid-controlling valve and the damper-actuating motor.

2. In combination with supply-pipe H, motor E, and a valve or damper actuated by said motor; double-acting valve *f* introduced into pipe H between the source of pressure and the motor E; thermostatically-controlled motor I for actuating valve *f*; reducing-valve J, located between the source of fluid-pressure and valve *f*; and reducing-valve K, located between the motor E and the outer atmosphere, substantially as set forth.

3. In combination with a temperature-controlling valve or damper; a fluid-pressure motor for actuating the same; a source of fluid-pressure; an intermediate fluid-controlling valve adapted and arranged to open communication between the source of pressure and the fluid-pressure motor and to close communication between said motor and the atmosphere, and to close communication between the source of supply and the motor, and open communication between the motor and the atmosphere; a motor for actuating said valve; a thermostat controlling said motor; and a reducing-valve between the source of supply and the fluid-controlling valve.

4. In combination with a temperature-controlling valve or damper, a fluid-pressure motor for actuating the same; a source of fluid-pressure; an intermediate fluid-controlling valve adapted and arranged to open communication between the source of pressure and the fluid-pressure motor, and to close communication between said motor and the atmosphere, and to close communication between the source of supply and the motor and open communication between the motor and the atmosphere; a motor for actuating said valve; a thermostat controlling said motor; and a reducing-valve between the motor of the temperature-controlling valve or damper and the fluid-controlling valve.

In witness whereof I hereunto set my hand in the presence of two witnesses.

WARREN S. JOHNSON.

Witnesses:
HORACE A. DODGE,
WILLIAM W. DODGE.